June 17, 1969     D. K. SWICK ET AL     3,449,816
METHOD OF REPAIRING SCREW-IN PRECOMBUSTION CHAMBER
TYPE OPENINGS IN CYLINDER HEADS Filed April 24, 1967     Sheet 1 of 2

INVENTOR.
CLARENCE E. SWICK
DWAIN K. SWICK
BY
ATTORNEYS 3,449,816
METHOD OF REPAIRING SCREW-IN PRECOMBUSTION CHAMBER TYPE OPENINGS IN CYLINDER HEADS
Dwain K. Swick and Clarence E. Swick, both of 440 N. Chestnut, McPherson, Kans. 67460
Filed Apr. 24, 1967, Ser. No. 633,026
Int. Cl. B23p 7/04; B23k 5/22; B22d 19/10
U.S. Cl. 29—402                                   6 Claims

ABSTRACT OF THE DISCLOSURE

This invention relates to a method of repairing defects in engine cylinder heads, and more particularly, to a method of removing and repairing defective openings adapted to contain either precombustion chamber members, spark plugs, fuel injectors or the like. Still, more specifically, this invention relates to a method of repairing defective openings in cylinder heads through the process of removing the defective area and using special cup members to retain weld material in the defective area for the setting up thereof prior to the final machining thereof to the required specifications.

---

In the operation of internal combustion engines, such as diesel engines, it is a rather common occurrence for the area about the precombustion chamber openings to become defective as having small fissures thereabout due to the continuous high pressure and temperature to which this area is normally subjected. These fissures permit the escape of hot combustion gases thereby making the engine inoperative or, at least, much less efficient. The defective areas are conventionally repaired by removing the metal thereabout, filling the void with a welding material, and remachining the repaired area to the original size and specifications. The prior art methods are subject to numerous shortcomings as the defective area is bridged by weld. This weld area has hard spots and excess slag where the weld is started. The casting is usually turned over and the bottom weld area is remelted to correct the poor quality weld. This requires extra time and expense and it is very difficult to keep the correct shape of this area. It requires extra time and expense to machine or grind this shape in the casting.

In accordance with the present invention, a new method for repairing threaded precombustion chamber type openings in cylinder heads is provided which includes the steps of (1) locating the defective area, normally about a precombustion chamber opening, to be repaired; (2) removing the defective area as by a boring operation; (3) placing a cup member in one end of the bored opening as a back-up for subsequent welding; (4) positioning and securing the cup member at the proper axial location relative to the bored opening; (5) filling the bored opening on top of the back up cup with a suitable high strength weld material; (6) machining the exposed surfaces of the weld material; (7) drilling a hole through the weld material and the cup member; (8) machining the exposed area of the cup member to the original specifications thereby removing the entire bottom surface of the cup member; and (9) threading the drilled hole to the original size and specifications. It is seen that the method of this invention utilizes simple steps operable to remove and replace a defective precombustion chamber opening with a new threaded opening constructed entirely of the high strength weld material.

Accordingly, it is an object of this invention to provide a new and novel method overcoming the above-mentioned disadvantages of the prior art devices.

One of the objects of this invention is to provide a back-up for the weld in a defective opening in a cylinder head. This back-up is to be made of similar material as the cylinder head and weld material. After welding the cylinder head, weld and back-up material essentially becomes one unit providing sufficient material to machine the cylinder head as it was originally.

A further object of this invention is to provide a means of repairing threaded precombustion chamber openings involving the steps of removing the defective area; inserting a weld back-up cup member within the removed area; filling the cup member and the defective area with a weld material; removing the excessive outer surfaces of the weld material and the cup member; and boring and threading an opening in the weld material conforming to the original size and specification of the precombustion chamber opening.

A still further object of this invention is to provide a method of repairing defective openings in cylinder heads that is simple to follow, inexpensive to achieve, utilizing a minimum of capital investment, and not requiring highly skilled personnel.

One other object of this invention is to provide a method of preparing threaded openings in cylinder heads involving the removal of the defective area, replacing the same with weld material, and machining a new threaded opening encased entirely in the weld material for high quality threads and strength.

Still, one other object of this invention is to provide a repaired precombustion chamber opening having a new threaded opening contained entirely within the repaired weld material.

Various other objects, advantages and features of the invention will become apparent to those skilled in the art from the following discussion, taken in conjunction with the accompanying drawings, in which.

Figure 1:
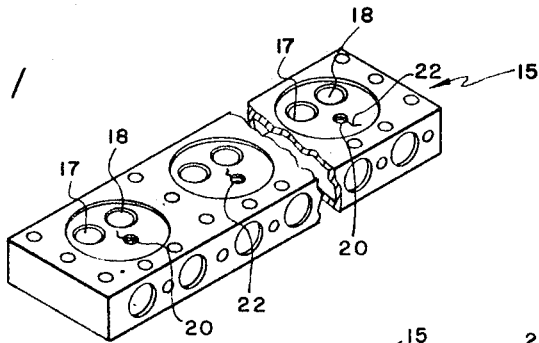
FIG. 1 is a perspective view of a cylinder head to be repaired by the method of this invention.
Figure 2:
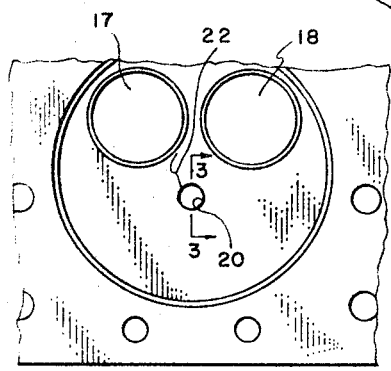
FIG. 2 is an enlarged fragmentary top plan view of a defective threaded precombustion chamber opening of the cylinder head of FIG. 1.

The following is a discussion and description of preferred specific embodiments of the new method of repairing defective threaded openings in cylinder heads of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the repair method of this invention is normally practiced on defective cylinder heads indicated generally at 15. It is to be understood that the invention can be practiced on numerous types of gasoline and diesel powered engine cylinder heads, such as shown in FIG. 1, having intake and/or exhaust ports 17 and 18, respectively, positioned adjacent a threaded opening 20. Depending on the type of engine, the threaded opening 20 is adapted to receive a fuel injector, a precombustion chamber member, or a spark plug depending on its operation. The method of this invention is concerned with repairing fissures 22 commonly found adjacent the threaded openings 20 due to the extreme heat and pressure to which this area is continuously subjected.

In practicing the method of this invention, a special cup-shaped member 24 is used having an outer diameter substantially greater than that of the threaded opening 20. The cup member 24 has a central cavity 25 with inwardly convergent sidewalls 27 integral with a common back wall 29 which is preferably of ⅛ inch thickness or more. The cup member 24 can be of any type of material compatible with the materials of the cylinder head 15; however, a cast iron material cup member 24 is normally used with the conventional cast iron cylinder heads so that the coefficient of expansion thereof is substantially identical for reasons to become obvious.

The first step in the method of this invention is locating the defective areas which can normally be done visually or by magnetic particle inspection; however, in some cases, the heating of the area about the threaded openings 20 is required to make the fissures 22 therein appear as dark lines thereby clearly indicating needed repair. Additionally, the use of dye-check, magnetic particle, and X-ray inspection methods can be used to locate and isolate the defective areas.

Figure 3:
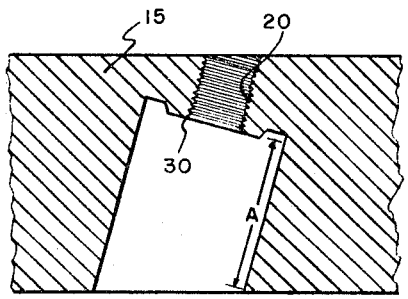
FIG. 3 is an enlarged sectional view taken along lines 3—3 in FIG. 2 illustrating the defective threaded precombustion chamber opening.

As shown in FIG. 3, the location of a reference surface 30 of a stepped portion surrounding the threaded opening 20 is carefully measured as indicated at A. This dimension A is extremely important in positioning axially the spark plugs, fuel injectors, or precombustion chamber member mounted in the openings 20 to achieve the proper combustion characteristics that must be maintained in the final repair cylinder heads 15.

Figure 4:
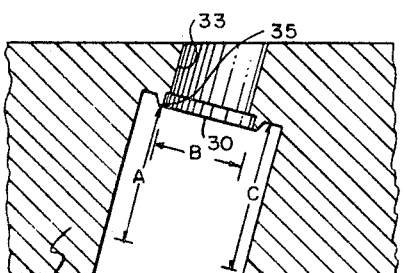
FIG. 4 is a view similar to FIG. 3 illustrating the defective area removed as by a boring process.

The defective area about the threaded opening 20 is then removed as by a boring operation thereby also removing all or part of the fissure 22 and forming a bored opening 33. Next, the bored opening 33 is step bored as indicated at 35 to a slightly greater diameter as indicated by letter B in FIG. 4. Diameter B is substantially equal to the outer diameter of the cup member 24 so as to receive the same in a slight press fit. The depth of a step bore 35, indicated at C, is closely controlled so as to be equal to the dimension A plus the thickness of the cup member 24 minus at least ⅛ inch which is the thickness of the back wall 29. This assures that the back wall 29 extends outwardly of the reference surface 30 at least the thickness of the back wall 29 and, preferably, an additional ¹⁄₁₆ of an inch for reasons to become obvious.

Figure 5:
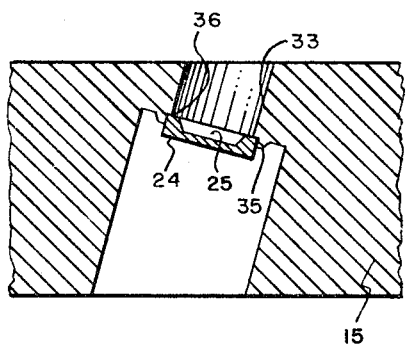
FIG. 5 is a view similar to FIG. 4 having the weld back-up cup member installed in the bored opening.
Figure 6:
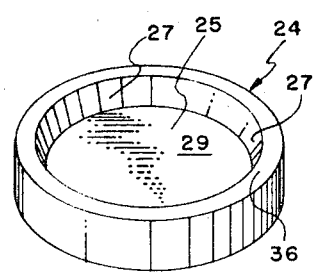
FIG. 6 is an enlarged perspective view of the cup member of this invention.

As shown in FIG. 5, the cup member 24 is placed within the step bore 35 under a slight press fit having the cavity 25 facing the bored opening 33. The outer peripheral surface and an inner face 36 of the cup member 24 abuts the junction of the board opening 33 and the step bore 35 thereby assuring proper placement thereof. If required, the cup member 24 can be secured to the adjacent reference surface 30 as by a tack weld 37 (FIG. 7) to keep the same from moving during the subsequent operations.

Figure 7:
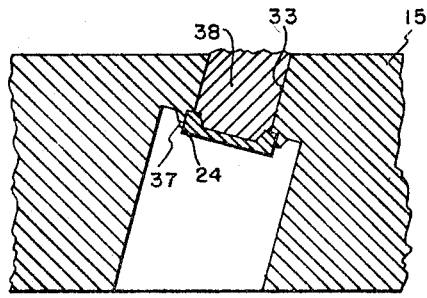
FIG. 7 is a view similar to FIG. 5 having the bored area filled with a weld material.

Next, the bored opening 33 is filled with a welding material 38 as shown in FIG. 7. The welding material 38 can be of a cast iron base so as to be completely compatible with the composition of the cylinder head 15 thereby assuring a complete fusion of the contacting surfaces of the bored opening 33. It is obvious that different types of weld material 38 could be used resulting in a plugged area having greater strength than the original material of the cylinder head 15. However, it is important that the weld material 38 and the cylinder head 15 have substantially the same coefficient of expansion to prevent the cracking of the cylinder head 15 and repaired area during the required heating and cooling operations thereof. The weld material 38 is slowing added to the bored opening 33 on top of the cup member 24 using the cup member 24 as a back-up to hold the weld puddle. This allows the weld puddle to be agitated causing the impurities to float to the top of the puddle and assuring the formation of a dense, uniform, non-porous center therein.

Figure 8:
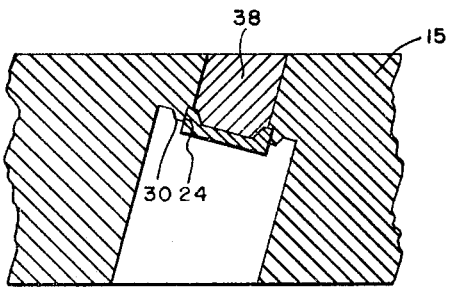
FIG. 8 is a view similar to FIG. 7 having the external portions of the weld material removed as by a machining operation.
Figure 9:
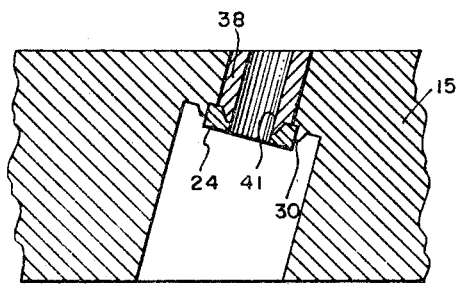
FIG. 9 is similar to FIG. 8 having a drilled opening in the center of the weld material and through the cup member.

The cylinder head 15 is then placed in an insulated condition to allow the same to slowly cool to prevent undue stresses which would result in cracks therein especially when dealing with cast iron cylinder heads. The weld material 38 and the cup member 24 are subjected to a machine operation as shown in FIG. 8 to face off the exposed outer face of the weld material 38. The weld material 38 and cup member 24 are drilled to form a hole 41, as shown in FIG. 9, to the required size for achieving the initial threaded opening size. The cup member 24 is faced off by machining to the depth or reference dimension A to obtain the original specification of the reference surface 30, as shown in FIG. 10.

Figure 11:
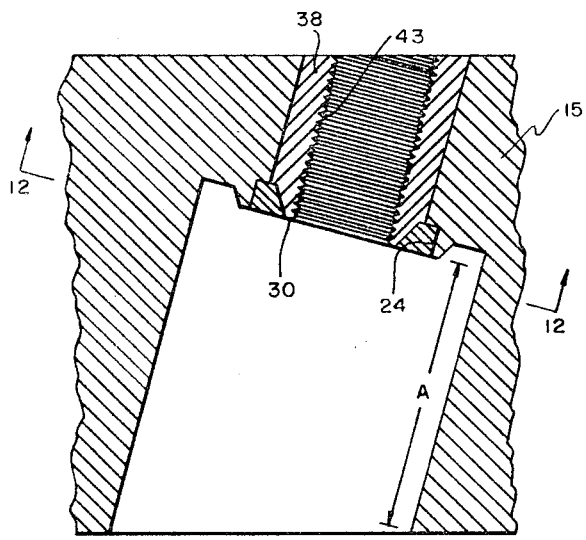
FIG. 11 is an enlarged view similar to FIG. 10 showing the drilled opening having been threaded.
Figure 12:
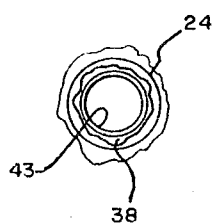
FIG. 12 is a reduced plan view of the new threaded precombustion chamber opening achieved by the method of this invention taken on line 12—12 of FIG. 11.

Then by conventional methods, the drilled hole 41 is threaded to achieve a new threaded opening 43 all in weld material 38 as shown in FIG. 11. It is seen that the end product of the method of this invention results in the threaded opening 43 having the threads entirely within the weld material 38 as the back wall 29 of the cup member 24 and perhaps a portion of the adjacent weld material 38 has been entirely removed from this area. This results in a high quality of threads replacing the defective or weakened threads in the original casting. An end result of this invention is to provide an economical method of repairing an otherwise unusable casting saving the consumer considerable cost in operating the machinery.

In summary, the method of repairing defective cylinder heads of this invention involves the steps of (1) locating the defective area; (2) obtaining the proper reference dimensions so as to be assured that the final product meets the required specifications of the cylinder head; (3) removing the defective threaded opening and area thereabout as by a boring operation; (4) machining a stepped area within the bored opening adapted to receive a cup member therein; (5) inserting the specially designed cup member within the stepped bored portion of the cylinder head to act as a back-up for the weld; (6) filling the bored opening with a suitable weld material; (7) machining exposed surface of the weld material; (8) drilling a hole through the weld material; (9) machining the exposed surface of the cup member to a proper specification so as to achieve the desired end result; and (10) threading the drilled hole so as to achieve a threaded opening meeting the original size and specification of the defective threaded opening in the cylinder head structure. It is seen that the cup member loses its identity in the opening after the machining, drilling, and threading operations as the threaded opening is contained entirely within the weld material.

Figure 10:
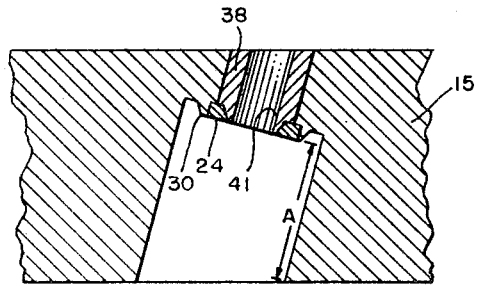
FIG. 10 is similar to FIG. 9 having the exposed outer surface of the cup member removed as by a machining operation.

In the final analysis as shown in FIG. 10, it is seen that the repaired cylinder head 15 presents a ring portion or remainder of the cup member 24 secured to the step bore 35 and a weld material portion 38 secured to the cup member 24 and the adjoining surfaces of the bored opening 33 with the plug portion containing entirely the threaded opening 43.

It is to be noted that the cup member of this invention can be of various sizes so as to be used for repairing various sizes of defective areas and primarily acts as a receptacle to maintain the weld material within the bored opening achieved on removing the defective area. It is seen that the method of this invention presents a simplified means of repairing defective cylinder heads readily adaptable to high production processes with a minimum amount of investment and operating cost.

As will be apparent from the foregoing description of the preferred embodiments of the applicant's new and novel method of repairing defective cylinder heads, relatively simple and inexpensive steps have been provided which are readily adaptable to conventional welding shop operations so as to provide a highly efficient and economical means of repairing defective areas in cylinder heads. Applicant's method eliminates a great deal of time-consuming and tedious work involved in repairing defective cylinder heads which, in the past, has proved very difficult in order to consistently produce a high quality repaired area.

While the invention has been described in connection with preferred specific embodiments thereof, it is to be understood that this description is intended to illustrate and not to limit the scope of the invention, which is defined by the following claims.

We claim:
1. A method of repairing defective areas normally found about a threaded opening in cylinder heads, comprising the following steps:
   (a) removing the defective material about said opening to form an enlarged opening,
   (b) partially inserting a cup-shaped member into one end of said enlarged opening and securing same therein with the open portion facing inwardly,
   (c) filling said cup-shaped member and said enlarged opening with welding material,
   (d) machining the outer portions of said welding material and said cup-shaped member thereby removing the entire bottom of said cup-shaped member, and
   (e) drilling and taping said welding material to form a threaded opening substantially identical in size to the first mentioned opening.
2. A repair method as described in claim 1, including:
   (a) before removing the defective material, measuring the distance of the outer surface of said first mentioned opening from a given reference point, and
   (b) on machining the outer surface of said cup-shaped member, measuring the machined surface to hold the same equal to the initial distance from said reference point.
3. A repair method as described in claim 2, wherein:
   (a) on inserting said cup-shaped member into said enlarged opening, positioning the same a distance equal to said reference distance minus at least the thickness of the bottom surface of said cup-shaped member to assure the complete removal thereof during said machining operation.
4. A repair method as described in claim 1, including:
   (a) after inserting said cup-shaped member into said enlarged opening, tacking as by welding said cup-shaped member to the adjacent portion of said cylinder head at a predetermined distance from a given reference point thereby assuring stabiilty of said cup-shaped member during the welding operation.
5. A repair method as described in claim 1, wherein:
   (a) removing the defective material by boring a hole therein equal to the diameter of said cup-shaped member and
   (b) locating said cup-shaped member in said enlarged opening a predetermined distance minus the thickness of said bottom surface of said cup-shaped member so that the machining operation removes the same while retaining a distance equal to that of said first mentioned opening prior to this repair method.
6. A repair method as described in claim 1, wherein:
   (a) the removing of the defective material achieved as by boring a diameter substantially greater than said first mentioned opening,
   (b) the inserting of said cup-shaped member in said enlarged opening under a slight press fit, and
   (c) the drilling and taping of said welding material achieved with the new threads completely contained in said welding material.

References Cited

UNITED STATES PATENTS

| | | | |
|---|---|---|---|
| 1,961,117 | 5/1934 | Wall | 29—491 X |
| 2,120,525 | 6/1938 | McKerihan | 29—401 |
| 2,352,716 | 7/1944 | Jones | 29—491 X |
| 3,192,618 | 7/1965 | Altgelt | 29—402 |
| 3,246,392 | 4/1966 | Altgelt | 29—402 |
| 3,351,043 | 11/1967 | Morrison | 29—402 X |
| 3,380,139 | 4/1968 | Kis et al. | 29—529 X |

CHARLIE T. MOON, *Primary Examiner.*

D. C. REILEY, *Assistant Examiner.*

U.S. Cl. X.R.

29—491, 529, 530; 123—32